Patented June 17, 1924.

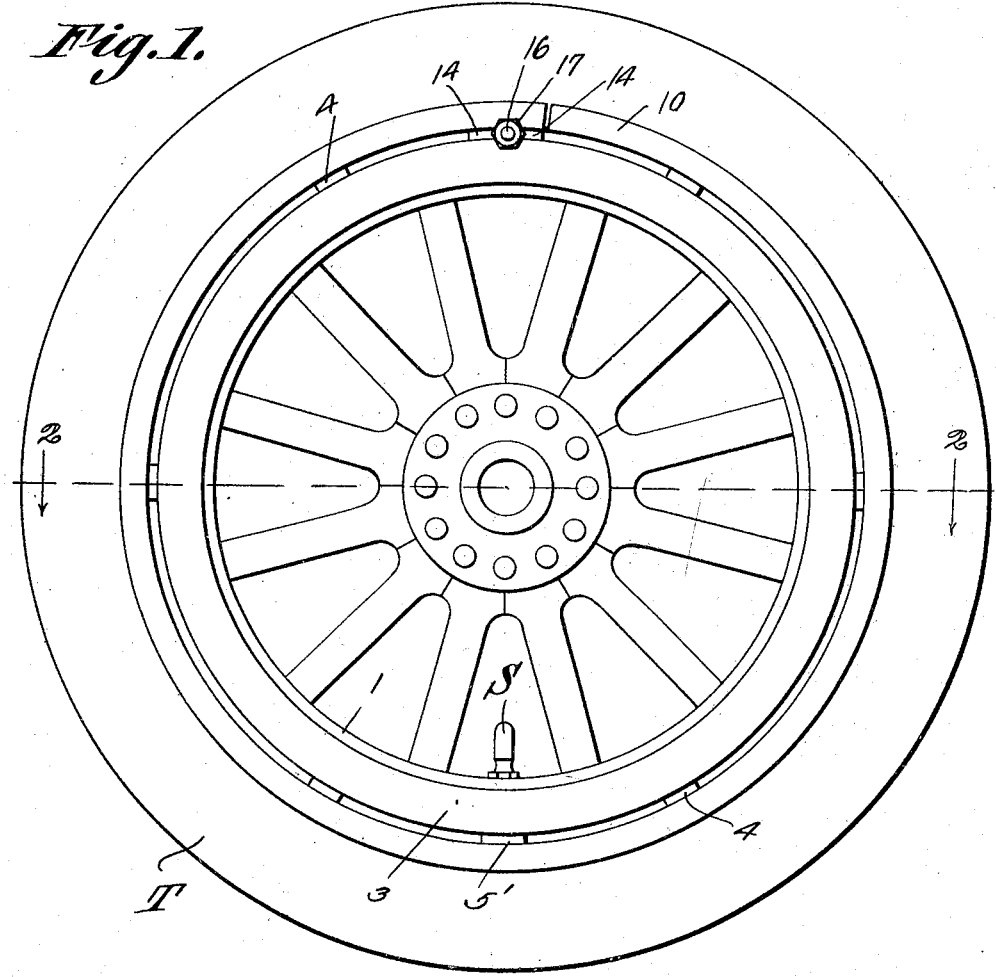
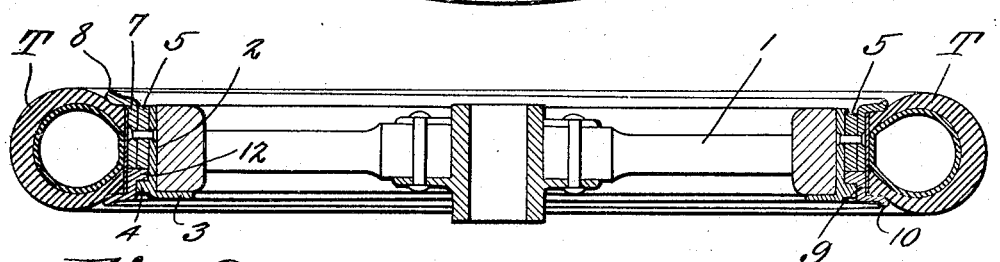

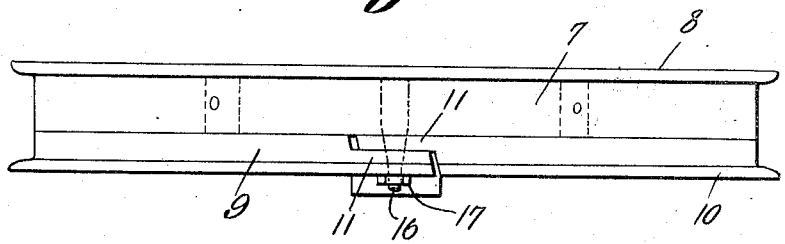
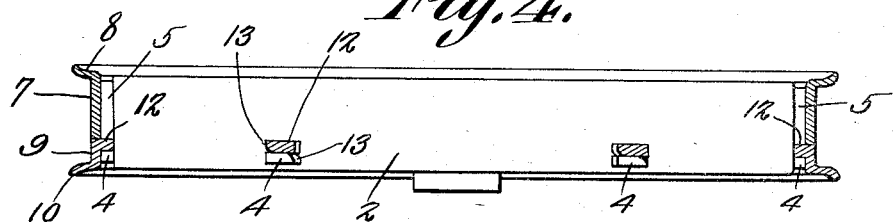
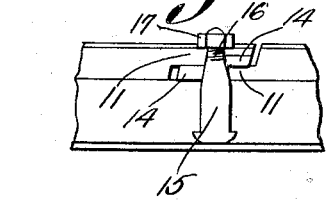
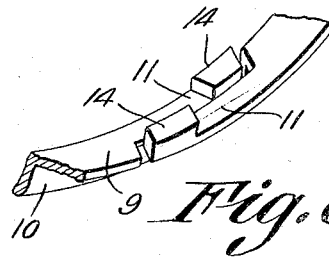
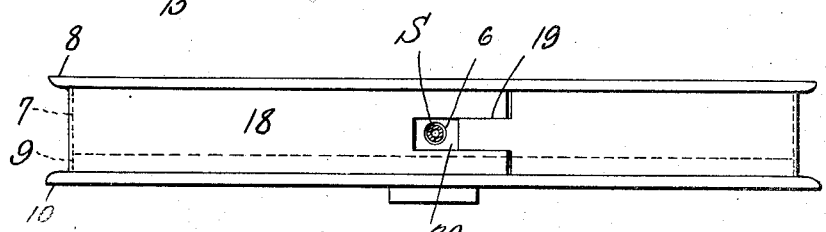

1,497,724

UNITED STATES PATENT OFFICE.

FRANKLIN PIERCE HUMMEL, OF CLYDE, OHIO, ASSIGNOR OF ONE-HALF TO THOMAS BOLIG, OF BELLEVUE, OHIO.

WHEEL RIM.

Application filed May 17, 1921. Serial No. 470,419.

*To all whom it may concern:*

Be it known that I, FRANKLIN P. HUMMEL, a citizen of the United States, residing at Clyde, in the county of Sandusky and State of Ohio, have invented a new and useful Wheel Rim, of which the following is a specification.

This invention relates to a rim for vehicle wheels, the same being of that type whereby a tire can be quickly attached to or disconnected from the wheel.

One of the objects of the invention is to provide a wheel with an inner rim and an outer rim, said outer rim being made up of a stationary member and a removable member having novel means cooperating with the inner rim whereby the parts can be held securely assembled in tire holding positions.

Another object is to provide an expansible and contractible removable rim section having means for drawing it tightly about the wheel and at the same time securing it to the stationary member of the outer rim.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a side elevation of a vehicle wheel having the present improvements combined therewith.

Figure 2 is a section on line 2—2, Figure 1.

Figure 3 is a plan view of the wheel with the tire removed.

Figure 4 is a plan view showing the outer rim members in section and showing the interfitting lugs upon the inner rim and the removable section of the outer rim.

Figure 5 is a bottom plan view of the top portion of the outer rim sections and showing the combined fastening and wedging bolt.

Figure 6 is a perspective view of the end portions of the removable section of the outer rim.

Figure 7 is a plan view of the outer rim and showing the protecting strip or band in position thereon.

Referring to the figures by characters of reference 1 designates a vehicle wheel of the ordinary construction to the periphery of which is attached a stationary metal rim 2 having a flange 3 at one side which extends inwardly and is adapted to lap one side portion of the wheel as shown particularly in Figure 2. This stationary or inner rim 2 is provided near one edge with spaced outstanding lugs 4. Secured to the rim 2 adjacent its other edge and at regular intervals are spacing plates or washers 5 one of which, 5', may be provided with an opening 6 to receive the valve stem S of the tire T mounted on the wheel.

Secured on the spacing washers 5 and 5' is the stationary section 7 of the outer wheel rim, this stationary section being provided along its outer edge with an annular flange 8 for engaging one of the beads of the tire T. The section 7 does not extend entirely across the rim 2 but, instead, a sufficient space is left upon the rim 2 to receive the removable section 9 of the outer rim. This removable section is provided at its outer edge with a flange 10 corresponding with the flange 8 and the said section is split so as to provide lapping tongues arranged side by side as shown at 11 in Figures 3, 5 and 6.

At regular intervals on the inner surface of the section 9 are provided inwardly extending lugs 12 so located that when the rim section 9 is shifted laterally onto the inner rim 2 the lugs 12 will pass between the lugs 4 and then by rotating the rim section 9 said lugs 12 will assume positions back of the lugs 4, as shown in Figure 4. Thus lateral withdrawal of the rim section 9 from the rim 2 is prevented. The lugs 4 and 12 can be provided with rounded ends as shown at 13 so as to facilitate the movement of the lugs 12 to positions back of the lugs 4.

Formed upon the inner surfaces of the tongues 11 at the free ends thereof are lugs 14 and these lugs are adapted to receive between them a flat wedging bolt or key 15 insertible between the inner and outer rims and having a threaded end 16 for engagement by a nut 17. Thus it will be seen that after the rim section 9 has been positioned as shown in Figure 4 the wedging bolt or key can be inserted between the inner and outer rims and between the lugs 14 whereupon by turning the nut 17 the lugs 14 can be shifted apart so as to contract the rim section 9 and cause it to bind tightly onto the lugs 4 and to cause the lugs 12 to bind tightly on the rim 2.

With the parts thus assembled it will be noted that they will not readily become disconnected but should it be desired quickly to remove the tire T located between the flanges 8 and 10 it would merely be necessary to remove the nut 17 and drive the key 15 from between the ears 14. Thus the rim section 9 can be expanded slightly and given a rotation to disengage the lugs 12 from the lugs 4 after which said section 9 can be easily lifted off of the wheel.

For the purpose of protecting the inner tube of the tire a band 18 of metal or the like is arranged between the flanges 8 and 10 and has its ends interfitting as shown at 19, said ends leaving a space 20 through which the valve stem S can project.

What is claimed is:—

The combination with a rim section having an annular tire engaging flange at one side, and outstanding lugs adjacent the other side, of a removable section having a tire engaging flange, said section having lapping ends, lugs upon said ends, a spreading bolt insertible between said lugs to bind the removable section upon the rim, and inwardly extending lugs upon the removable section, said removable section being rotatable on the rim to bring the inwardly extending lugs back of and in engagement with the lugs upon the first named rim section.

In testimony that I claim the foregoing as my own, I have hereto affixed my signature in the presence of two witnesses.

FRANKLIN PIERCE HUMMEL.

Witnesses:
 A. E. CULBERT,
 HAROLD E. CULBERT.